US012649888B2

(12) United States Patent
He et al.

(10) Patent No.: US 12,649,888 B2
(45) **Date of Patent: *Jun. 9, 2026**

(54) FLUORINATED MEDIA LUBRICANTS WITH REDUCED HYDROCARBON FRACTION FOR DATA STORAGE DEVICES

(71) Applicant: Western Digital Technologies, Inc., San Jose, CA (US)

(72) Inventors: Xingliang He, Fremont, CA (US); Jianming Wen, Pleasanton, CA (US); Charles Cheng-Hsing Lee, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,777

(22) Filed: Aug. 3, 2023

(65) Prior Publication Data

US 2024/0240097 A1 Jul. 18, 2024

Related U.S. Application Data

(60) Provisional application No. 63/453,353, filed on Mar. 20, 2023, provisional application No. 63/436,941, filed on Jan. 4, 2023.

(51) Int. Cl.

| | |
|---|---|
| ***C10M 107/38*** | (2006.01) |
| ***C10N 40/18*** | (2006.01) |
| ***G11B 5/60*** | (2006.01) |

(52) U.S. Cl.
CPC ......... *C10M 107/38* (2013.01); *G11B 5/6005* (2013.01); *C10M 2213/043* (2013.01); *C10N 2040/18* (2013.01)

(58) Field of Classification Search
CPC .......... C10M 107/38; C10M 2213/043; C10N 2040/18; G11B 5/6005
See application file for complete search history.

(56) References Cited

U.S. PATENT DOCUMENTS

| | | | |
|---|---|---|---|
| 6,099,937 | A | 8/2000 | Gui et al. |
| 6,731,446 | B2 | 5/2004 | Ikeda et al. |

(Continued)

FOREIGN PATENT DOCUMENTS

| | | | |
|---|---|---|---|
| EP | 0140582 | B1 | 8/1989 |
| EP | 3555174 | A1 | 10/2019 |

(Continued)

OTHER PUBLICATIONS

Guo et al., "A multidentate lubricant for use in hard disk drives at sub-nanometer thickness"; Journal of Applied Physics, 2012; https://aip.scitation.org/doi/10.1063/1.3677984; 8 pages.

(Continued)

*Primary Examiner* — James C Goloboy
(74) *Attorney, Agent, or Firm* — LOZA & LOZA, LLP; Gabriel Fitch

(57) ABSTRACT

A highly fluorinated lubricant configured to be adsorbed by an overcoat of a magnetic recording medium. The lubricant may have a structure:

$$R_1—R_f—R_1$$

where $R_f$ is $—CF_2O(CF_2CF_2O)_nCF_2—$ where n is from 1 to about 100, or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)CF_2—$, and r, s are independently from 1 to about 100, (Continued)

and $R_1$ is a fluorinated hydrocarbon having a functional group terminating in —OH.

16 Claims, 8 Drawing Sheets

(56) References Cited

U.S. PATENT DOCUMENTS

| | | | | |
|---|---|---|---|---|
| 7,715,302 | B2 | 5/2010 | Ohta et al. | |
| 8,178,480 | B2 | 5/2012 | Hamakubo et al. | |
| 8,787,130 | B1 | 7/2014 | Yuan et al. | |
| 9,117,475 | B2 | 8/2015 | Nakata et al. | |
| 9,382,496 | B1 | 7/2016 | Knigge et al. | |
| 9,466,322 | B2 | 10/2016 | Deng et al. | |
| 9,598,657 | B2 | 3/2017 | Isobe et al. | |
| 10,262,685 | B2 | 4/2019 | Pathem | |
| 10,373,632 | B2 | 8/2019 | Brand et al. | |
| 10,766,844 | B2 | 9/2020 | Valsecchi et al. | |
| 10,899,883 | B2 | 1/2021 | Galimberti et al. | |
| 10,947,476 | B2 | 3/2021 | Lu et al. | |
| 11,414,617 | B2 * | 8/2022 | Pathem | C10M 107/38 |
| 11,898,116 | B2 * | 2/2024 | Pathem | C10M 107/38 |
| 2002/0119316 | A1 | 8/2002 | Shukla et al. | |
| 2003/0176629 | A1 | 9/2003 | Blomquist et al. | |
| 2003/0181633 | A1 | 9/2003 | Blomquist et al. | |
| 2003/0185986 | A1 | 10/2003 | Ma et al. | |
| 2005/0031907 | A1 | 2/2005 | Matsuyama | |
| 2006/0229217 | A1 | 10/2006 | Liu et al. | |
| 2007/0060487 | A1 | 3/2007 | Burns et al. | |
| 2009/0045396 | A1 | 2/2009 | Hahn et al. | |
| 2010/0035083 | A1 | 2/2010 | Yang et al. | |
| 2011/0117386 | A1 | 5/2011 | Li et al. | |
| 2012/0097194 | A1 | 4/2012 | Mcdaniel et al. | |
| 2012/0219826 | A1 | 8/2012 | Li et al. | |
| 2012/0251843 | A1 | 10/2012 | Yan et al. | |
| 2013/0161181 | A1 | 6/2013 | Guo et al. | |
| 2013/0288080 | A1 | 10/2013 | Yan et al. | |
| 2014/0234666 | A1 | 8/2014 | Knigge et al. | |
| 2015/0235664 | A1 | 8/2015 | Deng et al. | |
| 2015/0275352 | A1 | 10/2015 | Ng et al. | |
| 2015/0361212 | A1 | 12/2015 | Takahashi et al. | |
| 2016/0068778 | A1 | 3/2016 | Conley et al. | |
| 2016/0260452 | A1 * | 9/2016 | Pathem | C10M 107/48 |
| 2016/0329074 | A1 | 11/2016 | Karis et al. | |
| 2017/0260472 | A1 | 9/2017 | Sagata et al. | |
| 2018/0233167 | A1 | 8/2018 | Sakane et al. | |
| 2018/0268853 | A1 | 9/2018 | Shimokawa et al. | |
| 2019/0352573 | A1 | 11/2019 | Hatta et al. | |
| 2020/0010619 | A1 | 1/2020 | Minami et al. | |
| 2022/0033582 | A1 | 2/2022 | Sagata | |
| 2022/0093127 | A1 * | 3/2022 | Kimura | C08G 65/329 |
| 2022/0154093 | A1 | 5/2022 | Pathem et al. | |
| 2022/0169941 | A1 | 6/2022 | Shibata et al. | |
| 2022/0220406 | A1 | 7/2022 | Pathem et al. | |
| 2022/0282176 | A1 | 9/2022 | He et al. | |
| 2022/0290066 | A1 | 9/2022 | He et al. | |
| 2022/0364008 | A1 | 11/2022 | Pathem et al. | |

FOREIGN PATENT DOCUMENTS

| | | | |
|---|---|---|---|
| JP | 4654339 | B2 | 3/2011 |
| KR | 20100067037 | A | 6/2010 |
| WO | 2015/182321 | A1 | 12/2015 |
| WO | 2017/099075 | A1 | 6/2017 |
| WO | 2018159232 | A1 | 9/2018 |
| WO | 2021002178 | A1 | 1/2021 |

OTHER PUBLICATIONS

Guo et al., "Multidentate functionalized lubricant for ultralow head/disk spacing in a disk drive"; Journal of Applied Physics; 2006; https://www.researchgate.net/publication/252269467_Multidentate_functionalized_lubricant_for_ultralow_headdisk_spacing_in_a_disk_drive; 9 pages.

Marchon et al., "Fomblin Multidentate Lubricants for Ultra-Low Magnetic Spacing"; IEEE Transactions on Magnetics; vol. 42, No. 10; Oct. 2006; https://ieeexplore.ieee.org/document/1704346; 4 pages.

Marchon, Bruno, "Lubricant Design Attributes for Subnanometer Head-Disk Clearance"; IEEE Transactions on Magnetics; vol. 45, No. 2; Feb. 2009; https://ieeexplore.ieee.org/document/4782079?reload=true; 6 pages.

Rhew et al., "Thermal Stability of Modified Perfluoropolyether Lubricants for Application in Heat Assisted Magnetic Recording"; Proceedings of the ASME/STLE 2011 International Joint Tribology Conference; 2011; https://doi.org/10.1115/IJTC2011-61044; 2 pages.

Jones et al., "Laser-Induced Thermo-Desorption of Perfluoropolyether Lubricant from the Surface of a Heat-Assisted Magnetic Recording Disk: Lubricant Evaporation and Diffusion"; ResearchGate; Jul. 1, 2015; https://www.researchgate.net/publication/281528079_Laser-Induced_Thermo-Desorption_of_Perfluoropolyether_Lubricant_from_the_Surface_of_a_Heat-Assisted_Magnetic_Recording_Disk_Lubricant_Evaporation_and_Diffusion; 7 pages.

Wu, Lin, "Modelling and simulation of the lubricant depletion process induced by laser heating in heat-assisted magnetic recording system"; IOP Publishing: Nanotechnology; vol. 18, No. 21; Apr. 27, 2007; https://iopscience.iop.org/article/10.1088/0957-4484/18/21/215702/pdf, 9 pages.

Zhang et al., "Lubrication for Heat-Assisted Magnetic Recording Media"; IEEE Transactions on Magnetics; vol. 42, Issue 10, Oct. 2006; https://ieeexplore.ieee.org/document/1704360; 3 pages.

International Search Report and Written Opinion for International Application No. PCT/US2021/041499, dated Sep. 9, 2021, 13 pages.

International Search Report and Written Opinion for International Application No. PCT/US2021/041500, dated Sep. 14, 2021, 15 pages.

Brunner, Ralf, "Properties of Carbon Overcoats and Perfluoro-Polyether Lubricants in Hard Disk Drives"; Ph.D Dissertation; University of California, San Diego; 2009; https://escholarship.org/uc/item/24w0q2v0; 248 pages.

* cited by examiner

FLUORINATED MEDIA LUBRICANTS WITH REDUCED HYDROCARBON FRACTION FOR DATA STORAGE DEVICES

CROSS REFERENCE TO RELATED APPLICATIONS

This application claims priority to and the benefit of U.S. Provisional Application No. 63/453,353, entitled "FLUORINATED MEDIA LUBRICANTS WITH REDUCED HYDROCARBON FRACTION FOR DATA STORAGE DEVICES," filed Mar. 20, 2023 and U.S. Provisional Application No. 63/436,941, entitled "FLUORINATED MEDIA LUBRICANTS WITH REDUCED HYDROCARBON FRACTION FOR DATA STORAGE DEVICES," filed Jan. 4, 2023, the entire content of each of which is incorporated herein by reference as if fully set forth below in its entirety and for all applicable purposes.

FIELD

The disclosure is directed to lubricants, and more particularly, to lubricants having an enhanced ratio of fluorine to carbon, where the lubricants are suitable for use in various applications, including magnetic recording media.

INTRODUCTION

The disclosure relates to lubricants suitable for use in magnetic storage media, and in particular, media configured for high energy recording such as heat assisted magnetic recording (HAMR), energy assisted magnetic recording (EAMR), or microwave assisted magnetic recording (MAMR). Magnetic storage systems, such as hard disk drive (HDD) systems, are utilized in a wide variety of devices in both stationary and mobile computing environments. Examples of devices that incorporate magnetic storage systems include data center storage systems, desktop computers, portable notebook computers, portable hard disk drives, network storage systems, high-definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main components, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disks. High energy recording such as HAMR increases the areal density (AD) of written data on a magnetic storage medium having high coercivity using high recording temperatures to write information to the medium. However, the high recording energy, microwaves or temperatures applied to the media may present new mechanical/chemical integration challenges. Other examples of magnetic storage media include flexible tape media usable for magnetic tape recording.

A few key challenges arise from the layer of lubricant that separates the outer layer of the disk from the recording head. The separation of the slider (e.g., encompassing the recording head) from the disk is often less than 10 nm. As such, the lubricant often must be low profile. However, the ultra-thin lubricant layer requires a new molecular architecture design concept to address these key concerns in approaching the low-profile design targets: head wear reduction, comprehensive contamination robustness improvement, flyability enhancement, thermal stability/oxidation resistance advancement, smear reduction, spacing/clearance gain, and processing/manufacturability improvement. A lower hydrocarbon fraction is thus sought after by the next-generation media lubricants to accomplish the aforementioned low-profile molecular design requirements. Specifically, hydrocarbon and humidity susceptibility are supposed to be effectively improved by lubricant fluorination for achievement of more comprehensive contamination-robust design of future head-media integrations, and ultimately get the unwanted smear generations efficiently repressed and flyability performance further improved. The high chemical inertness of a fluorinated lubricant molecule, originating from elimination of hydrocarbon fragments, can make head-disk contacts smoother and is expected to reduce head wear. In addition, fluorinated lubricant molecules should enhance molecular conformation while structuring a sub-monolayer thin film on the media disk surface. The new surface characteristics/polarity features and properties enabled by the enhanced molecular conformation with the increased interfacial chemical inertness are attractive to new media lubricant designs for the accomplishment of thermal stability/oxidation improvement, spacing/clearance gain, and processing/manufacturability improvements as well.

In addition, as the molecular weight of the lubricant backbone is reduced to a range of 100 to 10,000 Da, for gaining magnetic spacing and for decreasing head-disk clearance, the vapor pressure of the lubricant molecules increases exponentially. This will significantly increase desorption rate of the molecules and lubricant loss risk, ultimately resulting in the great instability of a sub-monolayer thick lubricant film. The lubricant must generally stay on the disk and not migrate into the environment of the HDD. If the lubricant migrates to the head, the head will effectively be forced to move away from the disk, thereby reducing recording performance based on the increased head-to-media spacing. Also, the lubricant should stay bonded on the disk stably and not be effortlessly evaporated into the environment of the HDD. Such media lubricant loss and/or film stability degradation will endanger the reliability, quality, and endurance of the component integrations of disk media with the head, thereby reducing overall performance of the actual HDD products. In addition, loss of the safeguard against disintegration of the necessary mechanical and chemical robustness (e.g., if the lubricant is disjoined from the disk surface, degraded, oxidized, and/or contaminated) can cause the HDD to suffer performance degradation, loss of reliability/durability, and other undesirable malfunctions. Reduction of the hydrocarbon fraction of a media lubricant via fluorinations can significantly mitigate such lube loss risks caused by the low-molecular weight designs.

A critical factor affecting HDD life, performance and reliability is temperature. As a result of the high temperatures of up to 300 to 600° C. associated with magnetic recording in a HAMR HDD, suitable lubricants for use in the corresponding media may benefit from high thermal stability and high oxidation resistance. In addition, the use of the higher temperatures also increases the presence of contaminants which may negatively affect performance, reliability, and durability of the HAMR drives. As such, there is a need in the art for high-temperature lubricants having properties suitable for use in HAMR drives, including the ability to sequester and/or remove contaminants prior to the contaminants interfering with data storage or other operational processes. Given the unique physical and chemical properties of fluorine atoms and fluorocarbon fragments/molecules, the high-temperature challenges imposed by the HAMR and EAMR head-disks interface designs can be well resolved by fluorination of the current and future media lubricants.

A typical HDD operating temperature range may be about 25° C. to about 45° C. A standard HDD storage temperature is between about 12° C. and about 33° C. HDD temperatures higher than about 45° C. lead to higher failure rates. Temperatures lower than about 25° C. also lead to higher failure rates. Moreover, aging HDD drives (3 years and older) are much more prone to failure when their average operating temperatures are 40° C. and higher.

There is thus a need in the art to obtain more chemically inert lubricants having specific properties and surface characteristics suitable for utilization in HDDs and magnetic recording media.

SUMMARY

In one aspect, this disclosure provides a highly fluorinated lubricant configured to be adsorbed by a magnetic recording medium, comprising: $R_1$—$R_f$—$R_1$, where $R_f$ is —$CF_2O(CF_2CF_2O)_nCF_2$— where n is from 1 to about 100, or $R_f$ is —$CF_2CF_2O(CF_2CF_2CF_2CF_2O)CF_2CF_2$—, —$CF_2CF_2O(CF_2CF_2CF_2O)_sCF_2CF_2$—, —$CF_2CF_2O[CF(CF_3)CF_2O]_sCF_2CF_2$—, —$CF_2O(CF_2CF_2O)_r(CF_2O)_sCF_2$—, or —$CF_2O(CF_2CF_2O)_sCF_2$—, and r, s are independently from 1 to about 100, and is a fluorinated hydrocarbon having a functional group terminating in —OH.

In one aspect, this disclosure provides a highly fluorinated lubricant configured to be adsorbed by a magnetic recording medium, comprising: $R_h$—$(R_1)_p$, where $R_h$ is a non-polar hybrid core, $R_1$ is a fluorinated hydrocarbon having a functional group terminating in —OH, and p is from 1 to 20.

In one aspect, this disclosure provides a highly fluorinated lubricant comprising: a plurality of segments, each linked together by ether linkages according to a general formula: $Re^1$—$Rb^1$—Ri-Rc-Ri-$Rb^2$—$Re^2$; wherein Re is a divalent center segment including a perfluoroalkyl ether moiety; wherein each of $Rb^1$ and $Rb^2$ is, independently, a sidechain segment including a perfluoroalkyl ether moiety having a reduced hydrocarbon fraction; wherein each Ri is optional, and independently is a divalent linking segment including a functional group including elements from Group 13-17 of the periodic table of the elements; and wherein each of $Re^1$ and $Re^2$ is a functional group terminating in an —OH moiety.

DETAILED DESCRIPTION

Figure 1A:
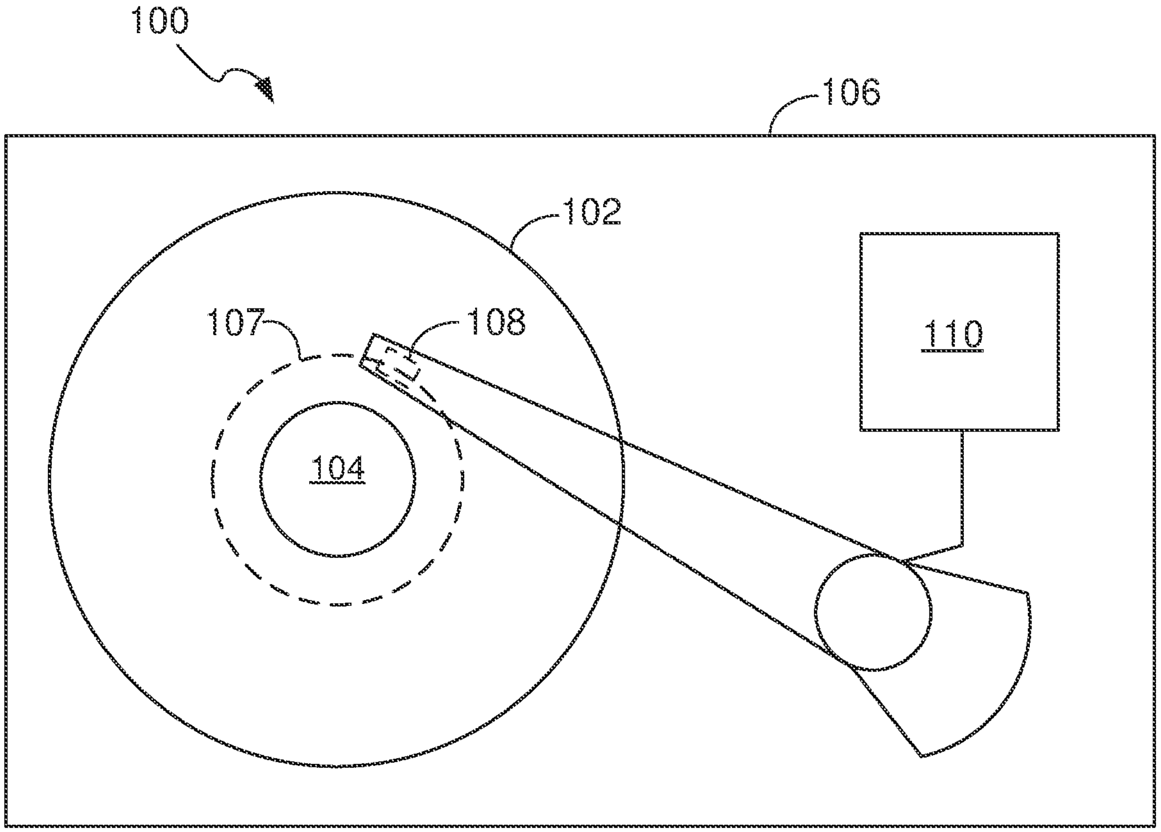
FIG. 1*a* is a diagram schematically illustrating a data storage device including a slider and a magnetic recording medium in accordance with one aspect of the disclosure.

Heat Assisted Magnetic Recording (HAMR) systems operate at substantially higher temperatures than traditional magnetic recording systems, also referred to herein as conventional magnetic recording (CMR) systems which do not employ heat or other energy assisted recording. Examples of CMR systems may include perpendicular magnetic recording disk drives and flexible tape media usable for magnetic tape recording, which do not employ heat or other energy assisted recording. HAMR is an example of magnetic recording within the class of Energy Assisted Magnetic Recording (EAMR) techniques, where conventional magnetic recording (CMR) is supplemented by other energy used in the system. Other examples of EAMR may include Microwave Assisted Magnetic Recording (MAMR) and applications of electric current into various conductive and/or magnetic structures near the main pole.

The thickness of a lubricant on the outer overcoat of magnetic recording media, a non-limiting example of which is a disk of a HDD, is less than 10 nm. The lubricant plays a number of roles at the head-disk interface, including spacing/clearance establishment, mechanical and chemical integration, contamination prevention, head wear reduction, head-disk interaction control, etc. ideally, the lubricant film stays on the disk and does not migrate elsewhere into the environment of the HDD. If it does migrate, the mechanical and chemical integrations of head and disks are changed and thereby performance is impacted. Loss of the protections provided by a lubricant film caused by evaporation, degradation, depletion/migration, and/or oxidation of the molecules can even result in head crash and ultimately the HDD to fail. When the organofluorine, hydrocarbon backbone chains, and/or certain functional groups of a lubricant molecule are degraded, decomposed, oxidized, depleted, and/or evaporated, the result is an increased likelihood of the lubricant film migrating away from the disk if the surface adsorption of the molecules is not greatly stabilized, especially in an oxidative environment.

This migration and contaminant problem is addressed by reducing the hydrocarbon content of the lubricant with respect to fluorocarbon, i.e., by increasing the fluorine to carbon ratio. For example, for the lubricant system:

$$R_1—R_f—R_1$$

where $R_f$ is —$CF_2CF_2O(CF_2CF_2CF_2CF_2O)_sCF_2CF_2$—, —$CF_2CF_2O(CF_2CF_2CF_2O)_sCF_2CF_2$—, —$CF_2CF_2O[CF(CF_3)CF_2$—$]_sCF_2CF_2$—, —$CF_2O(CF_2CF_2O)_r(CF_2O)_sCF_2$—, or —$CF_2O(CF_2CF_2O)CF_2$—, and r, s are independently from 1 to about 100, or $R_f$ is $-CF_2O(CF_2CF_2O)_n CF_2-$, it has been found the fluorine to hydrocarbon ratio is maximized. $R_1$ is a fluorinated group having a moiety including an —OH group configured to bond or adsorb with an overcoat of a magnetic recording media. This tendency to bond or adsorb is enhanced by preventing the bonded sites and carbon skeleton better from an exposure to contaminations with the chemically inert fluorocarbon fragments.

The fluorocarbon that is among the most chemically inert organics due to the extremely strong C—F bond, the fluorine atoms that are more space demanding and electronically denser, and the perfluoroalkyl chains (F-chains) that are bulkier and have larger trans-gauche interchange energy barrier than standard alkyl chains result in the unusual and advantageous properties of fluorinated organic molecules. These substantial changes in molecular behaviors are enabled by unique chemical/physical properties of fluorine atoms. Fluorine has 9 electrons (and 9 protons and 10 neutrons) as compared to only one electron (and one proton) for hydrogen. These 9 electrons are packed in a more compact way, leading to formation of denser electron cloud. For more specific comparisons between a fluorocarbon and a hydrocarbon, fluorine has a considerably larger electron affinity, a higher ionization potential than hydrogen, a lower polarizability than hydrogen, and the highest electronegativity of all atoms. The fluorine atom, being more space demanding, forces the C—C skeleton to adopt a helical arrangement rather than the usual planar zig-zag configuration found in hydrocarbon chains (H-chains). F-chains are thus bulkier than H-chains. The larger trans-gauche interchange energy barrier allows for fewer kinks on molecule and makes fluorocarbon more rigid. As a result, the electronically more dense and larger fluorocarbons can cover and protect the carbon skeleton/backbone and the active bonding sites more effectively than do the hydrocarbons.

Although hydroxyl (—OH) is a common end group, the lubricants of the disclosure may also terminate in a functional group selected from phosphonic acid, silanol or carboxylic acid. Phosphonic acid and silanol have 2 and 3 hydroxyl groups, respectively, at the bonding terminus of the lubricant to provide attachment to additional bonding sites on the overcoat. Phosphonic acid and carboxylic acid also have a higher degree of oxidation than hydroxyl, and will dehydrate, i.e., lose $H_2O$, more readily when contacting the hydroxyl group of the overcoat of the magnetic recording media.

In an aspect of the disclosure, the lubricant has a reduced hydrocarbon fraction and has the structure:

$$R_1—R_f—R_1$$

where $R_f$ is $-CF_2CF_2O(CF_2CF_2CF_2CF_2O)_sCF_2CF_2-$, $-(CF_2CF_2CF_2O(CF_2CF_2CF_2O)CF_2CF_2-$, $-CF_2CF_2O[CF(CF_3)CF_2O]_sCF_2CF_2-$, $-CF_2O(CF_2CF_2O)(CF_2O)_s CF_2-$, or $-CF_2O(CF_2CF_2O)_sCF_2-$, and r, s are independently from 1 to about 100, or Rr is $-CF_2O(CF_2CF_2O)-CF_2-$, and n is independently from 1 to 100. $R_1$ is a fluorinated group having a moiety including an —OH group configured to bond with an overcoat of a magnetic recording media. $R_1$ may also include a functional group selected from hydroxyl, phosphonic acid, silanol or carboxylic acid.

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g., Hf, Ti, or Zr. For purposes herein, molecular weight refers to number average molecular weight (Mn) and is expressed as grams per mole (g/mol) unless otherwise specified.

As used herein, and unless otherwise specified, the term "$C_n$" means hydrocarbon(s) having n carbon atom(s) per molecule, where n is a positive integer. Likewise, a "$C_m$-$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

The term "moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group containing of hydrogen and carbon atoms only. Preferred hydrocarbyls are $C_1$-$C_{20}$ radicals that may be linear, branched, star, comb, dendritic or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a heteroatom is any non-carbon atom, selected from groups 13 through 17 of the periodic table of the elements. In one or more aspects, heteroatoms are non-metallic atoms selected from B, N, O, Si, P, S, As, Se, and Te and the halogens F, Cl, Br, I, and At.

Unless otherwise indicated, the term "substituted" means that at least one hydrogen atom has been replaced with at least one non-hydrogen atom or a functional group.

For purposes herein, a functional group includes one or more of $Si(OH)_3$, $PO(OH)_2$, COOH, a hydrocarbyl group, a heteroatom, or a heteroatom containing group, such as halogen (such as Br, Cl, F or I) or at least one functional group such as $-NR^*_2$, —NR*—CO—R*, —OR*,*—O—CO—R*, —CO—O—R*, —SeR*, —TeR*, —PR*, $-PO-(OR^*)_2$, $-O-PO-(OR^*)_2$, $-AsR^*_2$, $-SbR^*_2$, —SR*, $-SO_2-(OR^*)_2$, $-BR^*_2$, $-SiR^*_3$, $-(CH_2)q-SiR^*_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

In one or more aspects, functional groups may include: a saturated $C_1$-$C_{20}$ radical, an unsaturated $C_1$-$C_{20}$ radical, an alicyclic $C_3$-$C_{20}$ radical, a heterocyclic $C_3$-$C_{20}$ radical, an aromatic $C_5$-$C_{20}$ radical, a heteroaromatic $C_5$-$C_{20}$ radical, a cyclotriphosphazine radical, a halogen, $-NR^*_2$, —NR*—CO—R*, —OR*, —O—CO—R*, —CO—O—R*, —SeR*, —TeR*, $-PR^*_2$, $-PO-(OR^*)_2$, $-O-PO-(OR^*)_2$, $-N{=}P(NR^*_2)_3$, $-AsR^*_2$, —SR*, $-SO_2-(OR^*)_2$, $-BR^*_2$, $-SiR^*_3$, $-(CH_2)q-SiR^*_3$, $-(CF_2)q-SiR^*_3$, or a combination thereof, wherein q is 1 to 10 and each R* is, independently a hydrogen, a halogen, a saturated, unsaturated, aromatic, and/or heterocyclic $C_1$-$C_{20}$ radical.

For purposes herein, a functional group, which is attachable to a surface of a magnetic recording medium, refers to functional groups having increased affinity for that surface relative to the affinity of perfluoroalkyl ethers to that same surface. Increased affinity may include Van der Waals forces, weak London Dispersion forces, dipole-dipole forces, and/or the like, and/or one or more types of bonds and/or dative bonds with the surface of the magnetic recording media, preferably with a protective overcoat of a recording media. In one or more aspects, a functional group which is attachable to a surface of a magnetic recording medium refers to functional groups having increased affinity for the carbon overcoat (COC) layer of the magnetic recording media, relative to the affinity of perfluoroalkyl ethers to that same surface.

A heterocyclic ring, also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of multiple chemical elements. A "derivative" refers to a compound in which one or more of the atoms or functional groups of a precursor compound have been replaced by another atom or functional group, generally by means of a chemical reaction having one or more steps.

For purposes herein, unless otherwise specified, the lubricants include a plurality of segments and each segment is attached to the other segment by an ether bond, e.g., a —C—O—C— linkage. For purposes herein, a segment including a perfluoropolyalkyl ether moiety may have the general formula:

$$-(CF_2)_aO-;$$

wherein each a is from 1 to 10. A segment including a perfluoroalkyl ether moiety has the general formula:

$$-(CF_2)_aO)_b-;$$

wherein each a is from 1 to 10 and b is the number of repeating units in the segment.

The perfluoroalkyl ether moieties present in a particular segment are bonded together to form a perfluoropolyalkyl ether chain. Unless indicated otherwise, each of the perfluoroalkyl ether moieties present in a perfluoropolyalkyl ether segment may be the same or different. For example, the following are each examples of a perfluoropolyalkyl ether segments:

i) $-(CF_2CF_2O)_b-$, a perfluoropolyethylether segment;

ii) $-(CF_2CF_2CF_2O)_b-$, a perfluoropolypropylether segment;

iii) $-(CF_2CF_2CF_2CF_2O)_b-$, a perfluoropolybutylether segment; and iv) $-(CF_2CF_2O)_b-(CF_2O)_b-$, a perfluoropolyethylether-perfluoropolymethylether segment, also referred to in the art as a Z-chain segment.

For purposes herein, the molecular weight of a segment, e.g., a divalent center segment including a perfluoroalkyl ether moiety Re and/or a divalent sidechain segment including a perfluoroalkyl ether moiety $Rb^1$ and $Rb^2$ is defined as the molecular weight of the perfluoroalkyl ether moieties present in the segment.

Unless otherwise indicated, a divalent center segment, abbreviated Rc herein, refers to a divalent chemical moiety optionally including a perfluoroalkyl ether moiety, or optionally which is formed from one or more perfluoroalkyl ether moieties, that is chemically bonded via an ether linkage to linking segment moieties on either side.

An intermediate or linking segment, abbreviated as Ri herein, refers to a chemical moiety bonded between the center segment and a sidechain segment by an ether linkage, and which includes at least one functional group, which is preferably selected to attached to the protective layer of the magnetic recording media.

A side chain segment, abbreviated Rb herein, refers to a divalent chemical moiety including a perfluoroalkyl ether moiety, or formed from one or more perfluoroalkyl ether moieties, that is chemically bonded via an ether linkage to a linking segment moiety and an end segment.

An end segment, abbreviated Re herein, refers to a mono-valent radical which includes at least one functional group preferably selected to attach to the protective layer of the magnetic recording media. The end moieties are located at either end of a sidechain of the lubricant molecule.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, conformational isomers, spatial isomers, and/or the like.

As used herein, the term "adsorption" refers to individual molecules, atoms or ions gathering on a surface. In comparison, the term "absorption" is where a material is soaked into a bulk of another phase or material such as a sponge, cloth, filter, etc.

Data Storage Device

FIG. 1*a* is a top schematic view of a data storage device 100 (e.g., disk drive or magnetic recording device) configured for heat assisted magnetic recording (HAMR) including a slider 108 and a magnetic recording medium or disk 102 having a lubricant layer according to one or more aspects of the disclosure. The laser (not visible in FIG. 1*a* but see 114 in FIG. 1*b*) is positioned with a head/slider 108. The disk drive 100 may include one or more disks/media 102 to store data. Disk/media 102 resides on a spindle assembly 104 that is mounted to a drive housing. Data may be stored along tracks in the magnetic recording layer of disk 102. The reading and writing of data is accomplished with the head 108 (slider) that may have both read and write elements (108*a* and 108*b*). The write element 108*a* is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). Note that while an example HAMR system is shown, the various embodiments described may be used in other EAMR or non-EAMR magnetic data recording systems, including perpendicular magnetic recording (PMR) disk drives or magnetic tape drives.

Figure 1B:
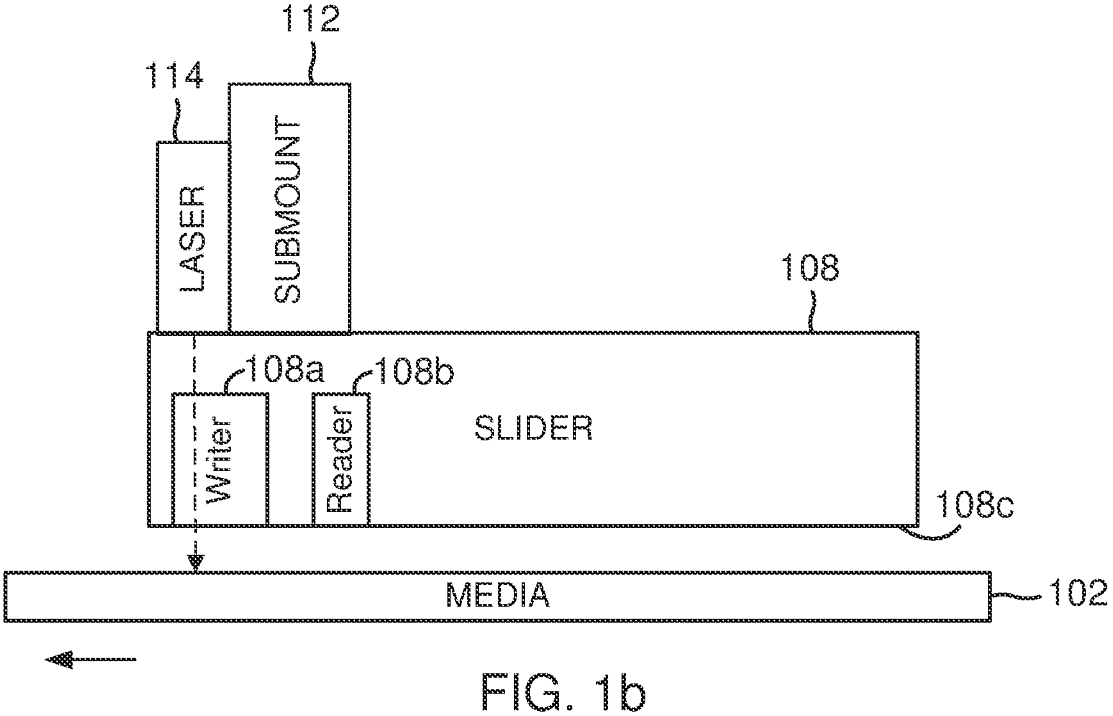
FIG. 1*b* is a side schematic view of the slider and magnetic recording medium of FIG. 1*a* in accordance with one aspect of the disclosure.

FIG. 1*b* is a side schematic view of the slider 108 and magnetic recording medium 102 of FIG. 1*a*. The magnetic recording medium 102 includes a lubricant layer (see FIG. 2) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108*a* and a read element (e.g., reader) 108*b* positioned along an air bearing surface (ABS) 108*c* of the slider for writing information to, and reading information from, respectively, the media 102. In other aspects, the slider may also include a layer of the lubricant (not shown).

In operation, the laser 114 is configured to generate and direct light energy to a waveguide (e.g., along the dashed line) in the slider which directs the light to a near field transducer (NFT) near the air bearing surface (e.g., bottom surface) 108*c* of the slider 108. Upon receiving the light from the laser 114 via the waveguide, the NFT generates localized heat energy that heats a portion of the media 102 within or near the write element 108*a*, and near the read element 108*b*. The anticipated recording temperature is in the range of about 300° to 500° C. In the aspect illustrated in FIG. 1*b*, the laser directed light is disposed within the writer 108*a* and near a trailing edge of the slider. In other aspects, the laser directed light may instead be positioned between the writer 108*a* and the reader 108*b*. FIGS. 1*a* and 1*b* illustrate a specific example of a HAMR system. In other examples, the magnetic recording medium 102 with the lubricant layer according to aspects of the disclosure can be used in other suitable HAMR systems (e.g., with other sliders configured for HAMR). The technology can also be used in EAMR and MAMR systems.

Magnetic Recording Medium

Figure 2:
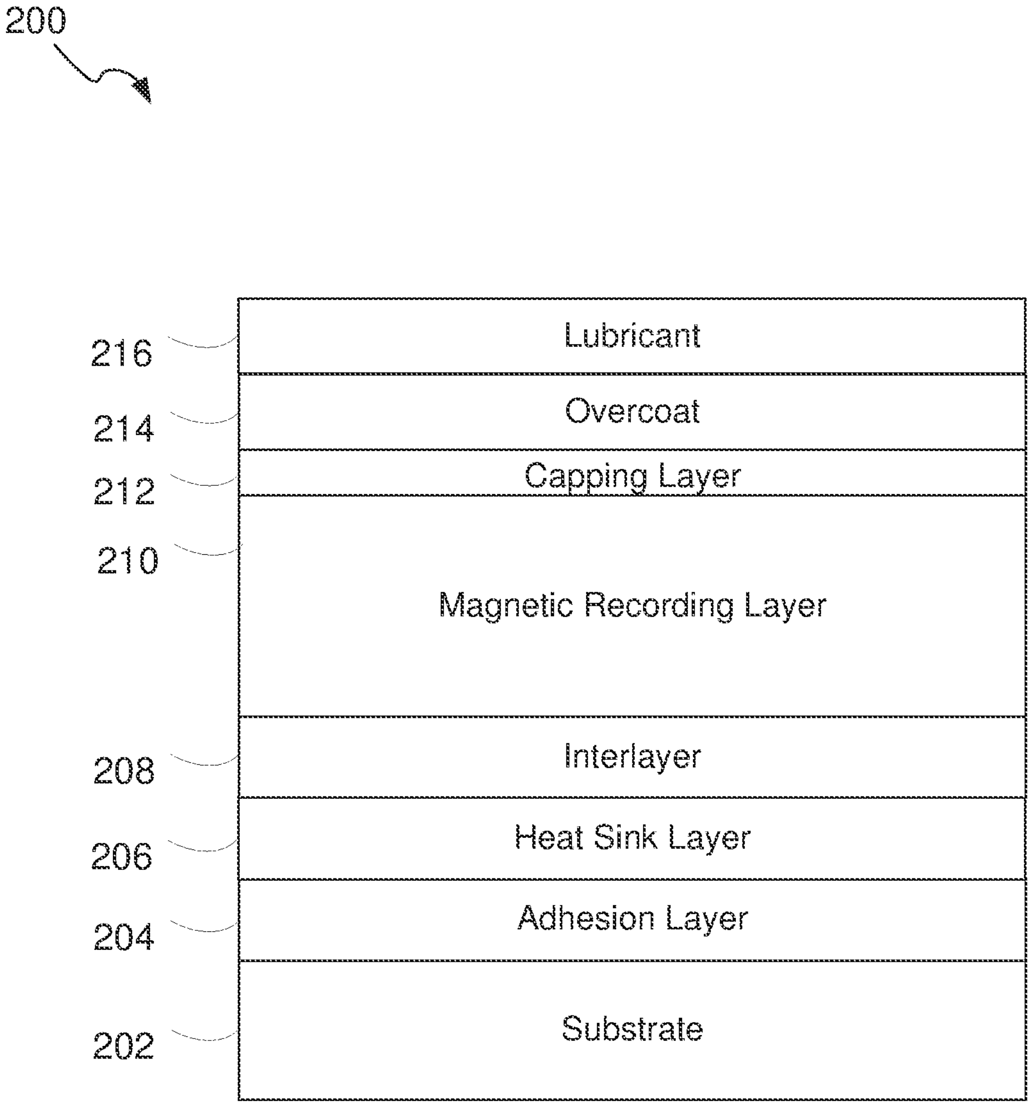
FIG. 2 is a side schematic view of a heat assisted magnetic recording medium configured for heat assisted magnetic recording (HAMR) and including a lubricant layer in accordance with one aspect of the disclosure.

FIG. 2 is a side schematic view of a magnetic recording medium 200 having a lubricant layer according to one or more aspects of the disclosure. In one aspect, the magnetic recording medium 200 may be used in a data storage system configured for HAMR, EAMER or MAMR (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. In one aspect, the substrate 202 can be made of one or more materials such as an Al alloy, NiP plated Al, glass, glass ceramic, and/or combinations thereof. In some aspects, the magnetic recording medium 200 may have some or all of the layers illustrated in FIG. 2 and/or additional layer(s) in various stacking orders. It should also be noted that each layer shown in FIG. 2 may include one or more sub-layers. For example, the magnetic recording layer may have multiple layers in certain embodiments.

In one aspect, this disclosure also provides a data storage system (e.g., 100), including: at least one magnetic head (e.g., 108*a*, 108*b*), a magnetic recording medium (e.g., 102, 200) including a lubricant (e.g., 216) according one or more aspects disclosed herein, a drive mechanism (e.g., 110 plus a head gimbal assembly attached to 108) for positioning the at least one magnetic head over the magnetic recording medium, and a controller electrically coupled to the at least one magnetic head for controlling operation of the at least one magnetic head.

In one aspect, this disclosure also provides a data storage system (e.g., 100), including a slider (e.g., 108) comprising at least one magnetic head (e.g., 108*a*, 108*h*) and an air bearing surface (ABS) (e.g., 108*c*), where a lubricant according one or more aspects disclosed herein is disposed on the ABS, and a magnetic recording medium (e.g., 102, 200) including a magnetic recording layer (e.g., 210); wherein the slider is configured to write information to the magnetic recording layer using heat assisted magnetic recording (HAMR) energy assisted magnetic recording (EAMR) or microwave assisted magnetic recording (M AMR).

In one aspect, the disclosure provides a hard disk drive including a magnetic recording disk with a substrate having an overcoat, to which is adsorbed a lubricant formed from a highly fluorinated lubricant according to aspects of the disclosure.

Lubricants

In one aspect, lubricants disclosed herein may function as a lubricating molecular layer which may be used in various mechanical devices, including data storage systems configured for magnetic recording (e.g., hard disk drives or tape drives) and other microelectronic mechanical systems. The polymeric or macromolecular lubricants may form a lubricant layer when one or more functional groups of the lubricant adsorb or otherwise couple with the surface being lubricated. For instance, a lubricant layer 216 is formed on a magnetic recording medium 200 (e.g., a disk that includes a magnetic recording layer 210) that moves relative to other parts in the mechanical device. This lubricant layer 216 helps to protect the magnetic recording medium from friction, wear, contamination and/or damage caused by interactions between the magnetic recording medium and other parts in the mechanical device (e.g., interactions, such as contact, attrition, abrasion, erosion between a slider and the magnetic recording medium in a certain circumstance). In other words, this interfacial polymeric and/or molecular layer helps enable reliable, robust, and enduring chemical/mechanical integrations of the magnetic recording medium with the read/write heads.

Figure 3:
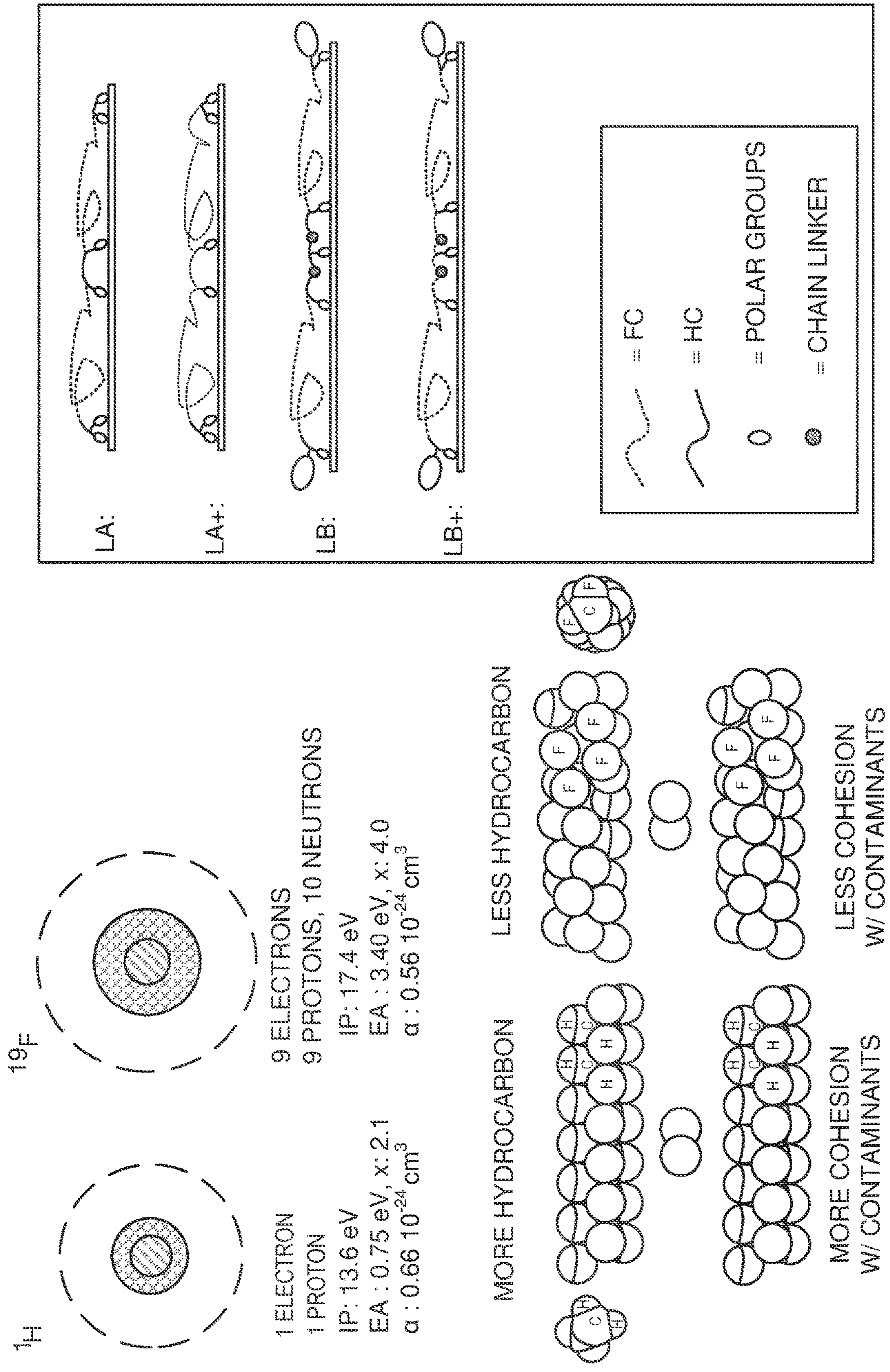
FIG. 3 shows the conceptual effect between having a greater or lesser fraction of hydrocarbon in the lubricant.

FIG. 3 shows the relationship between the balance of hydrocarbons compared to fluorine and the effect on cohesion and the generation of contaminants. In the disclosure, a more chemically robust lubricant layer is desirable for media tribo-interface design. The fluorocarbon that is among the most chemically inert organics due to the extremely strong C—F bond, the fluorine atoms that are more space demanding and electronically denser, and the perfluoroalkyl chains that are bulkier and have larger trans-gauche interchange energy barrier than standard alkyl chains result in the unusual and advantageous properties of fluorinated organic molecules. These substantial changes in molecular behaviors are enabled by unique chemical/physical properties of fluorine atoms. Fluorine has 9 electrons (and 9 protons and 10 neutrons) as compared to only one electron (and one proton) for hydrogen. These 9 electrons are packed in a more compact way, leading to formation of denser electron cloud. For more specific comparisons between a fluorocarbon and a hydrocarbon, fluorine has a considerably larger electron affinity, a higher ionization potential than hydrogen, a lower polarizability than hydrogen, and the highest electronegativity of all atoms. The fluorine atom, being more space demanding, forces the C—C skeleton to adopt a helical arrangement rather than the usual planar zig-zag configuration found in hydrocarbon chains (H-chains). F-chains are thus bulkier than H-chains. The larger trans-gauche interchange energy barrier allows for fewer kinks on molecule and makes fluorocarbon more rigid. As a result, the electronically more dense and larger fluorocarbons can cover and protect the carbon skeleton/backbone and the active bonding sites more effectively than do the hydrocarbons.

A comparison of the properties of hydrogen and fluorine atoms helps to elucidate the difference. Hydrogen ($^1H$) has 1 electron and 1 proton, an ionization potential (IP) of 13.6 eV, an electron affinity (EA) of 0.75 eV, an electronegativity ($\chi$) of 2.1 and a ground state polarizability (a) of $0.66\times10^{-24}$ $cm^3$. In comparison, fluorine ($^{19}F$) has 9 electrons, 9 protons, 9 neutrons, an IP of 17.4 eV, and EA of 3.40 eV, a $\chi$ of 4.0 and an $\alpha$ of $0.56\times10^{-24}$ $cm^3$. These different properties, arising from the denser electron cloud of fluorine yielding a higher IP and EA, result in that more hydrocarbons will cause more cohesion with contaminants and fewer hydrocarbons will cause less cohesion with contaminants.

Thus, enhancing the fluorocarbon (FC) to hydrocarbon (HC) ratio will yield superior performance where LA→LA+, LB→LB+, etc.

Figure 4:
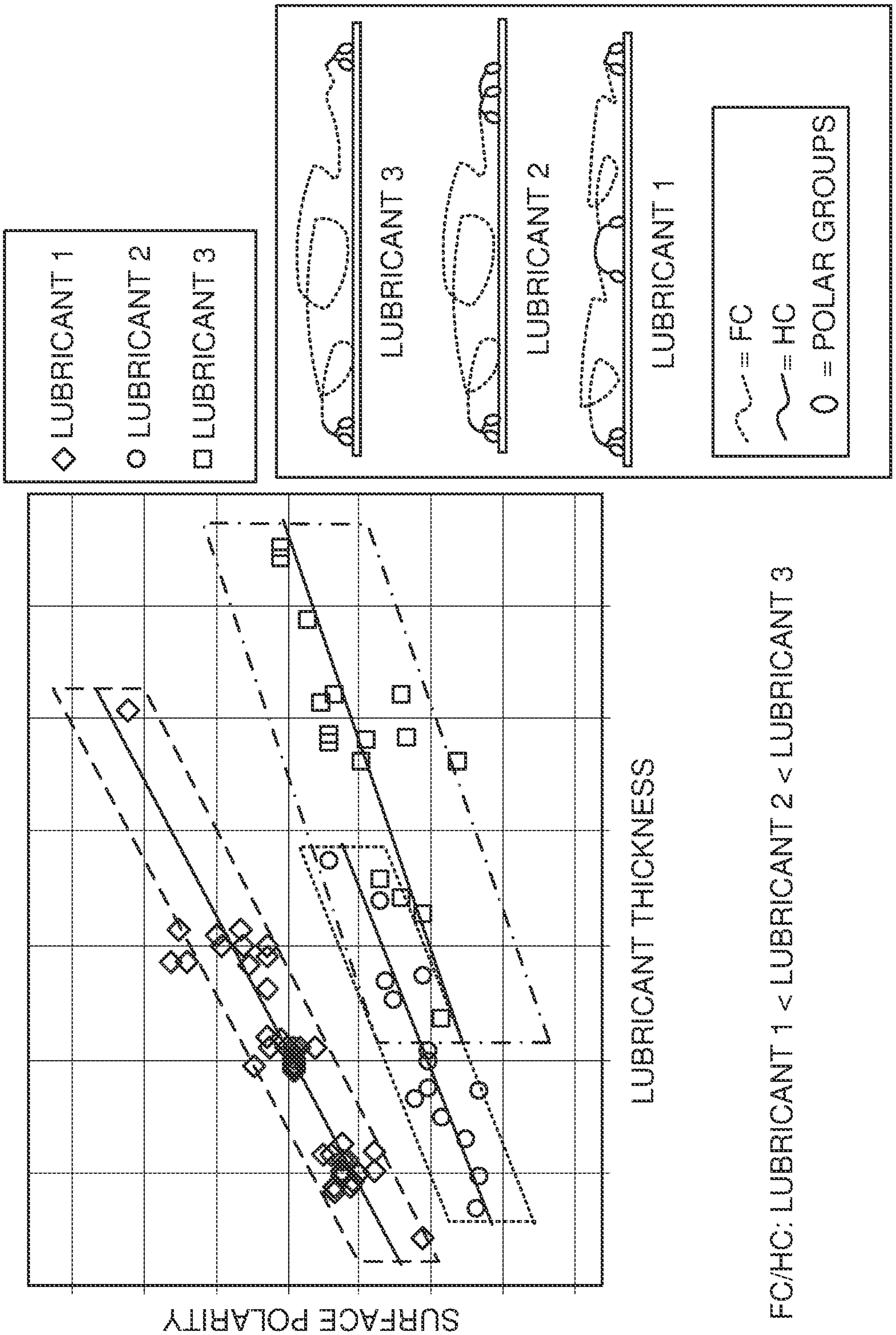
FIG. 4 is a graph showing the effect of surface polarity as a function of lubricant thickness for lubricants having greater and lesser amounts of hydrocarbon in the lubricant.

FIG. 4 shows the relationship of surface polarity as a function of lubricant thickness for 3 lubricants showing the relationship of less polar fragments versus more polar fragments. The three lubricants all have fluorocarbon moieties, hydrocarbon moieties and polar groups configured to bond to the overcoat of magnetic recording media. The ranking of the fluorocarbon to hydrocarbon ratio (FC/HC) is as follows:

$$\text{Lubricant 1} < \text{Lubricant 2} \leq \text{Lubricant 3}.$$

As can be seen, the higher the FC/HC ratio becomes, the lower the polarity becomes. The result is improved chemical robustness, as shown by the reduced surface polarity. That is, the reduced surface polarity induced by increasing the FC/HC ratio inhibits attraction and/or condensations of contaminants. It is observed that Lubricant 1 has up to about 1.2 times the surface polarity of Lubricant 3 throughout the thickness range. Lubricant 1 has up to about 1.2 times the polarity of Lubricant 2 at the low end of the thickness range and up to about 1.1 times the surface polarity of Lubricant 2 at the high end of the thickness range. That is, increasing the FC/HC ratio in this representative example will result in about 20% reduction in the surface polarity. Here, a lubricant with a first ratio of fluorocarbon to hydrocarbon ($FC/HC_{first}$) yields a significant reduction in surface polarity than a lubricant with a second ratio of fluorocarbon the hydrocarbon ($FC/HC_{seond}$), the second ratio being less than the first ratio. Also, (the first ratio of fluorocarbon to hydrocarbon) (the second ratio of fluorocarbon to hydrocarbon)$^{-1}$, i.e., $(FC/HC_{first})(FC/HC_{second})^{-1}$ can be about 1.1-10. A typical value in this range can be about 1.5:1.

Figure 5:
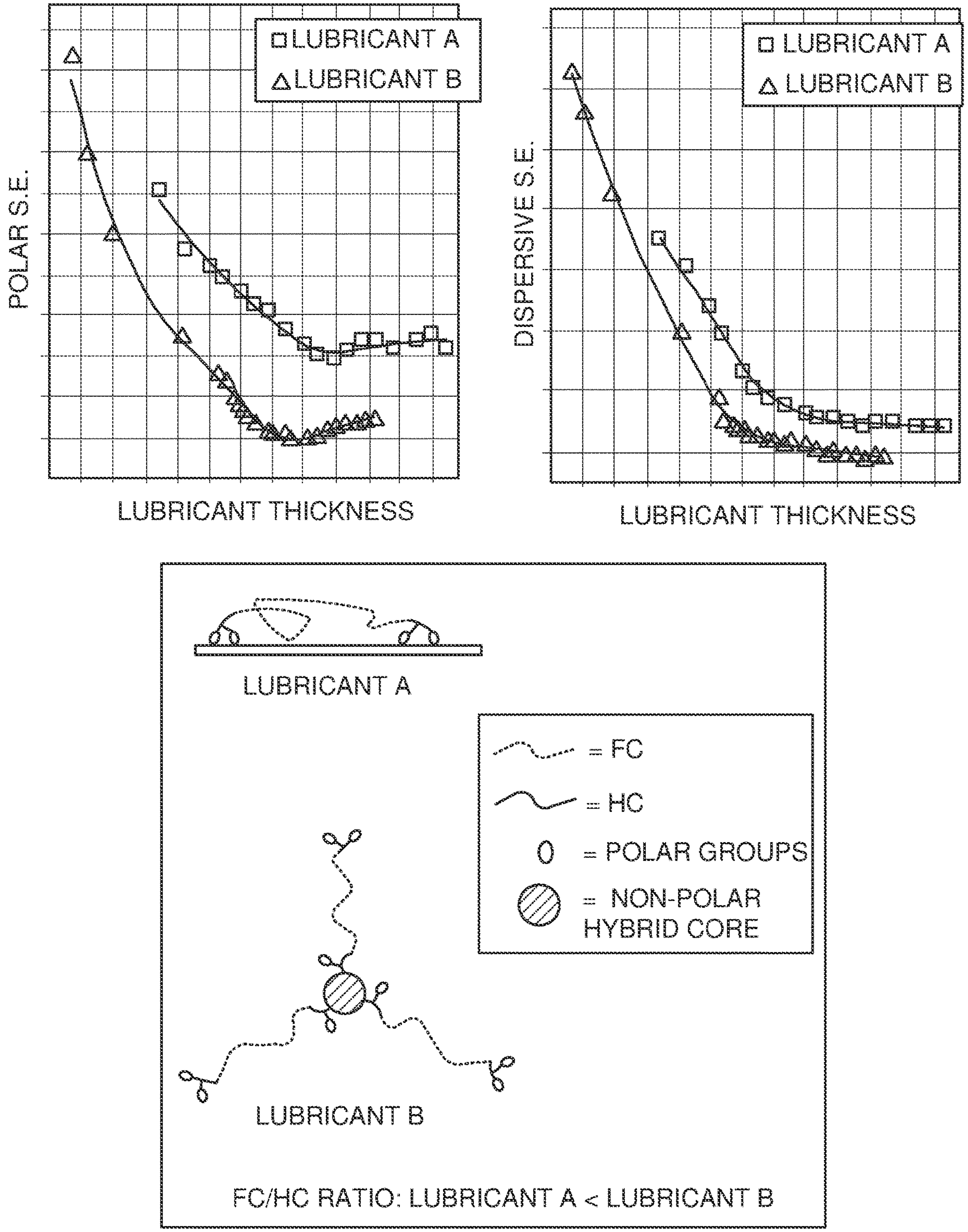
FIG. 5 includes graphs showing a comparison of the surface energy of high fluorocarbon to hydrocarbon lubricants medium for an HDD according to an aspect of the disclosure.

This effect is further elucidated in FIG. 5, which shows the polar surface energy and dispersive surface energy as a function of lubricant thickness for Lubricant A (which has a single fluorocarbon backbone terminating in polar groups) compared to Lubricant B (which has a non-polar hybrid core from which radiates a number of fluorocarbon arms). The ranking of FC/HC ratio is as follows:

$$\text{Lubricant } A < \text{Lubricant } B.$$

As can be seen, the surface energies as a function of lubricant thickness are less for Lubricant B, which has the higher FC/HC ratio. The polar surface energy and the dispersive surface energy are observed to plateau as the lubricant thickness increases. At the inflection point, approaching mono-layer lubricant films, the polar surface energy of Lubricant A is about 3 times higher than the polar surface energy of Lubricant B. As the lubricant thickness increases the polar surface energy of Lubricant A is still about 2 times higher than the polar surface energy of Lubricant B. Regarding the dispersive surface energy, there is a similar effect where the dispersive surface energy of Lubricant A is much higher than the dispersive energy of lubricant B at the inflection point and continues to be higher than the dispersive surface energy of Lubricant B in the plateau area. That is, the higher the FC/HC ratio, the less active the lubricant surface becomes. The result is lower surface energy by about ⅓ to about ½ (50% to 67%) for the lubricant having the higher FC/HC ratio.

That is, wherein the lubricant with a first ratio of fluorocarbon to hydrocarbon yields a lower polar surface energy and a decreased dispersive surface energy of the lubricant than a lubricant with a second ratio of fluorocarbon to hydrocarbon, the second ratio being less than the first ratio, whereby effective lubricant thickness design is reduced. Here, a comparative ratio of the first ratio to the second ratio, i.e., $(FC/HC_{first})(FC/HC_{second})^{-1}$, is about 1.1-4:1. In one example the comparative ratio may be about 3:1.

The FC/HC ratio of the lubricants depicted in FIG. 3, FIG. 4 and FIG. 5 can also be considered by accounting for changes in substituent chain length by normalization and setting the FC/HC ratio of Lubricant 1 (Lubricant A) to 1. In this case, suitable ratios of the (FC/HC)Lubricant:(FC:HC) Lubricant 1 can be as follows:

Lubricant 2: about 2.5-3:1
Lubricant 3: about 3-3.5:1
Lubricant B: about 2.5-3:1
Lubricant LA+: about 2.5-3 to 1
Lubricant LB+: about 3-3.5:1

Figure 6:
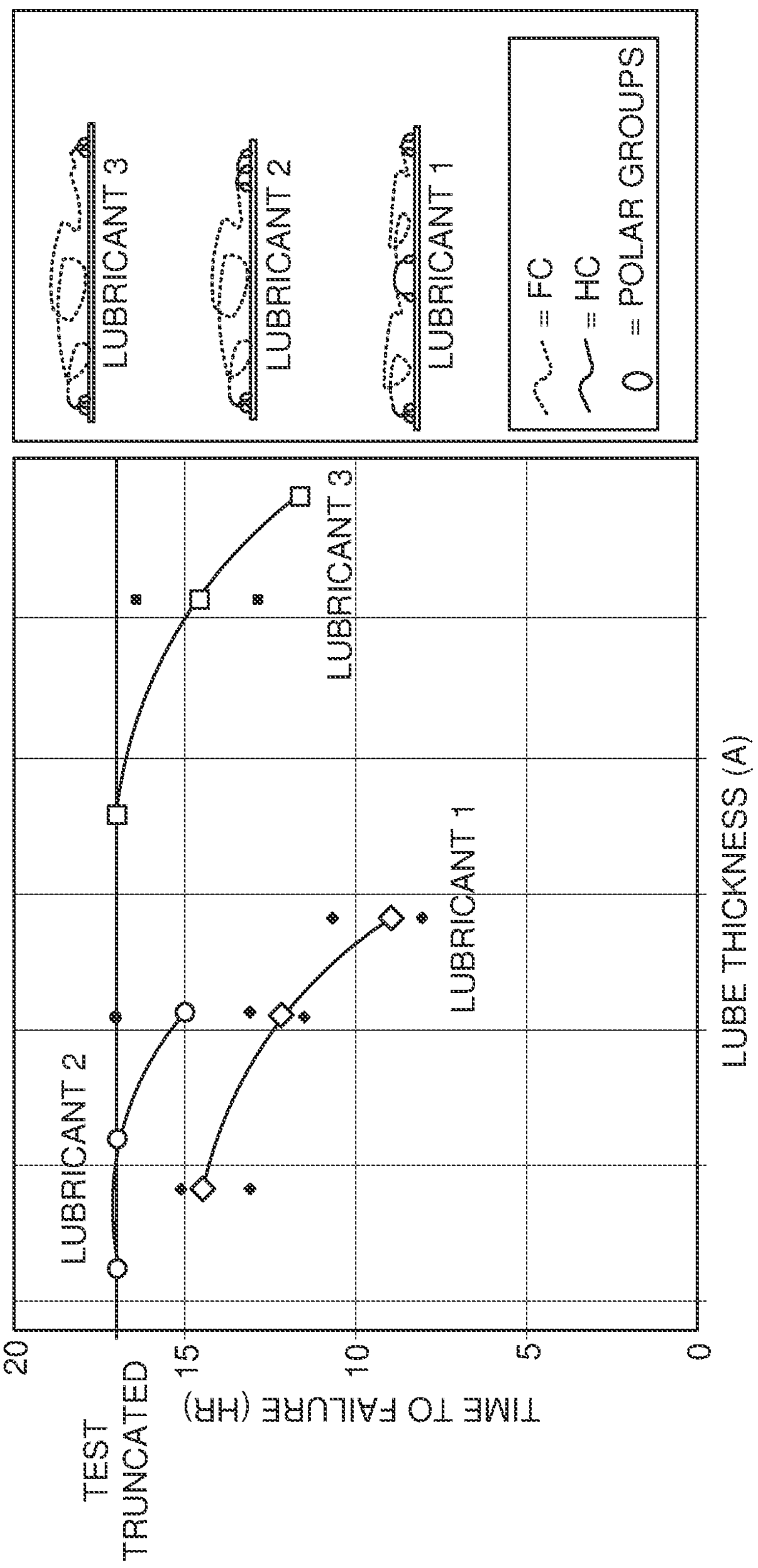
FIG. 6 is a graph showing component test results of the hydrocarbon robustness (time to failure) improvement with higher FC/HC ratio.

FIG. 6 is a graph showing the hydrocarbon robustness (time to failure using a component-level accelerated tribological test) improvement with higher FC/HC ratio. Lubricant 1 has the greatest amount of hydrocarbon, with hydrocarbon moieties being present at the center and ends of the molecule. Lubricant 2 and Lubricant 3 have perfluorinated center fragments. The degree of fluorination (FC/HC ratio) is thus:

$$\text{Lubricant 1} \leq \text{Lubricant 2} \leq \text{Lubricant 3}.$$

The hydrocarbon robustness is thus ranked as:

Lubricant 3 ≥ Lubricant 2 > Lubricant 1.

As can be seen in FIG. 6, Lubricant 1, with the lowest proportion of fluorine, has the poorest performance with failure at ranging from about 8 to 15 hours even at reduced lubricant thickness. Lubricants 2 and 3 showed better performance with no failure at lower thickness until the test was truncated after 17 hours, meaning the time to failure is greater than about 17 hours in such stressful component tests. That is, with FC versus HC the comparison is the less polar fragment to the more polar fragment. The higher the FC/HC ratio means lower polarity and improved chemical robustness.

Figure 7:
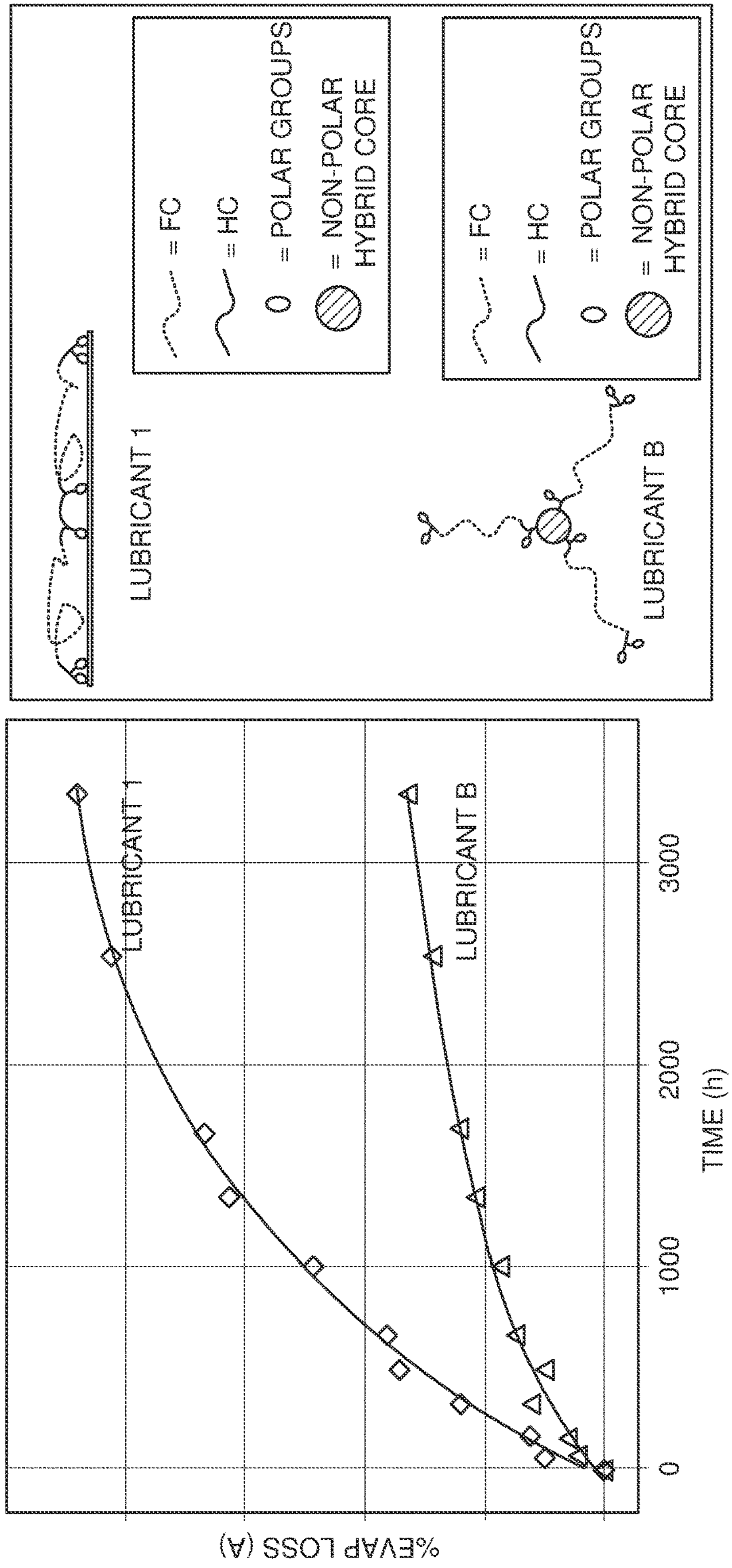
FIG. 7 is a graph showing the evaporation loss risk mitigation (evaporation loss) with increased FC/HC ratio.

In the disclosure, the risk of evaporation loss at elevated temperatures is mitigated as the FC/HC ratio is increase. FIG. 7 is a graph showing the percentage evaporation loss as a function of time (hours). Lubricant 1 has 2 arms extending from a non-FC core, and Lubricant 2 has 3 arms extending from a non-polar hybrid core. The ratio is thus about 3:2 or about 1.5:1 in an overall range of about 1.1-10:1. The ranking of the FC/HC ratio is:

Lubricant 1 < Lubricant *B*.

The lubricant loss risk ranking is:

Lubricant 1 > Lubricant *B*.

As can be seen in FIG. 7, chemical inertness improves by increasing the FC/HC ratio. The evaporation loss percentage of Lubricant 1 is about 3 times the evaporation loss percentage of Lubricant B at 500 hours, about 2.5 times the evaporation loss percentage at 100 hours, about 2.9 times the evaporation loss percentage at 2000 hours and about 2.8 times the evaporation loss percentage at 3000 hours. That is, as the trend lines plateau, Lubricant 1 will have about 3 times the evaporation loss percentage of Lubricant B. Thus, by increasing the FC/HC ratio the evaporation loss percentage will decrease by a great amount, i.e., about two thirds. Chemical inertness improvement by increasing FC/HC ratio should enhance contamination robustness as the probability for water, organics, and other contamination molecules-induced physical bonding cleavage is effectively reduced. As a result, the lower lube loss at elevated temperature (i.e., 60° C.) is obtained for a higher FC/HC lubricant.

Thermogravimetric Analysis (TGA) of the lubricants of the disclosure also demonstrates the advantages of increasing the FC/HC ratio. TGA is a method of thermal analysis in which the mass of a sample is measured over time as the temperature changes.

Figure 8:
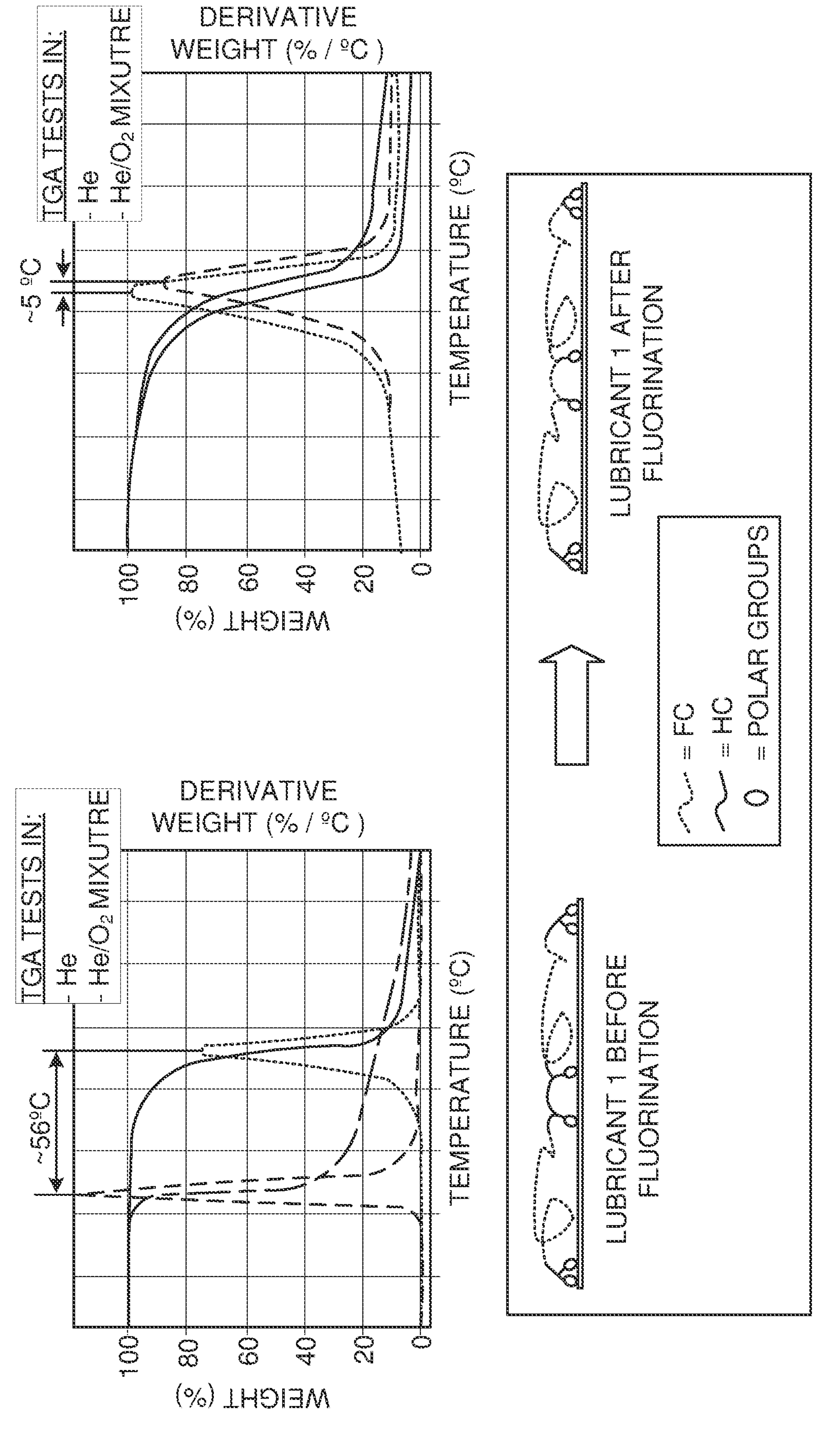
FIG. 8 includes graphs of thermal gravimetric analysis (TGA) results showing oxidation retardation by fluorination.

FIG. 8 includes TGA graphs showing the weight loss in non-oxidative (He atmosphere) and oxidative ($He/O_2$ mixture atmosphere). The comparison is for Lubricant 1 before fluorination compared to Lubricant 1 after fluorination.

As can be seen in FIG. 8, Lubricant 1 before fluorination has an approximately 56° C. (101° F.) spread between the weight loss (as shown by the dotted derivative lines) in the non-oxidative and oxidative environments. In comparison, the fluorinated Lubricant 1 has a tight spread of approximately −5° C. (−9° F.) between the weight loss in the non-oxidative and oxidative environments. That is, oxidation retardation of a media lubricant can be accomplished by fluorination. FIG. 8 shows that the onset of significant weight loss in the oxidative environment is dramatically pushed to a higher temperature by fluorinating the molecule. As a result, a high FC/HIC ratio yields a TGA curve in an oxidative atmosphere that approximates the TGA curve in a non-oxidative atmosphere.

There are additional formulations for $R_f$ in the lubricants according to aspects of the disclosure. For example, $R_f$ may be $—CF_2CF_2O(CF_2CF_2CF_2CF_2O)_sCF_2CF_2—$, $—CF_2CF_2O(CF_2CF_2C_2O)_sCF_2CF_2—$, $—CF_2CF_2O[CF(CF_3)CF_2O]_sCF_2CF_2—$, $—CF_2O(CF_2CF_2O)_r(CF_2O)_sCF_2—$, or $—CF_2O(CF_2CF_2O)_sCF_2—$ and r, s are independently from about 1 to about 100. This is in addition to the more linear formulation where $R_f$ may be $—CF_2O(CF_2CF_2O)CF_2$ and n=1-100. In all cases the PFPE chain ($R_f$) terminates in chemisorbed groups such as —OH, but which may also be selected from hydroxyl, phosphonic acid, silanol or carboxylic acid. The chemisorbed groups are configured to be bonded to an overcoat layer over a substrate of a magnetic recording medium via an oxygen moiety. This molecular design can greatly strengthens/stabilize surface adsorption of lubricant molecules.

The structure of the highly fluorinated lubricants according to the disclosure can be based on having a fluorinated central structure or alternatively having a non-polar central structure, i.e., a hybrid core, that can be aromatic in nature.

The highly fluorinated lubricant may have the structure:

$$R_1—R_f—R_1$$

where $R_f$ is $—CF_2O(CF_2CF_2O)CF_2—$ where n is from 1 to about 100, or $R_f$ is $—CF_2CF_2O(CF_2CF_2CF_2CF_2O)_sCF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)_r(CF_2O)\ CF_2—$, or $—CF_2O(CF_2CF_2O)_sCF_2—$, and r, s are independently from about 1 to about 100, or r, s are independently from 1 to about 100, and $R_1$ is a fluorinated hydrocarbon having a functional group terminating in —OH—. Other structures for $R_f$ many include $—CF_2O(CF_2CF_2O)_nCF_2—$, $—CF_2O(CF_2CF_2CF_2O)CF_2—$, or $—CF_2O(CF_2CF_2CF_2CF_2O)_nCF_2—$, etc., having the general formula $CF_2O((CF_2)_pO)_n)CF_2—$ where p is from 1 to 10 and n is from about 1 to about 100.

The functional group containing —OH may have a number of structural variations, including:

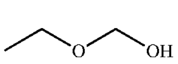 or 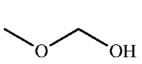 or

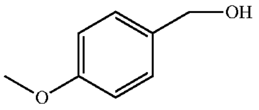

In aspects of the disclosure the functional group can also have the formula:

$$—(CH_2)_a—COOH$$

where a is from 1 to 20.

The lubricant with the non-polar hybrid core according to aspects of the disclosure, may have the formula:

$$R_h—(R_1)_p$$

where $R_h$ is a non-polar hybrid core, $R_1$ is a fluorinated hydrocarbon having a functional group terminating in —OH, and p is from 2 to 8. $R_h$ may be selected from, but is not restricted to, naphthalene, phenalene, phenanthrene, pyrene and triphenylene:

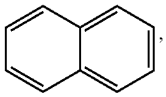
,
Naphthalene

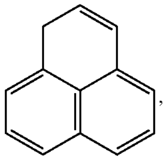
,
Phenalene

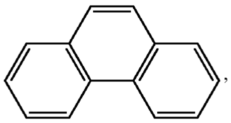
,
Phenanthrene

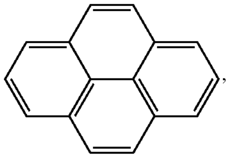
, or
Pyrene

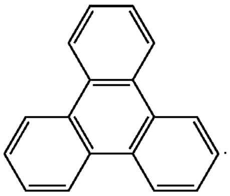
.
Triphenylene

The disclosure is not limited to these PAH rings but can include any suitable PAH ring, such as is set forth in Table 1.

TABLE 1

Polyaromatic Hydrocarbons, Their Formulas and Their Chemical Abstracts Service (CAS) Numbers.

| Name | Molecular Formula | CAS No. |
|---|---|---|
| Acenaphthylene | $C_{12}H_8$ | 208-96-8 |
| Acephenanthrylene | $C_{16}H_{10}$ | 201-06-9 |
| Acridine | $C_{13}H_9N$ | 260-94-6 |
| Anthanthrene | see Dibenzo[def,mno]chrysene | |
| Anthracene | $C_{14}H_{10}$ | 120-12-7 |
| 9,10-Anthracenedione | $C_{14}H_8O_2$ | 84-65-1 |
| 9(10H)-Anthracenone | $C_{14}H_{10}O$ | 90-44-8 |
| Anthraquinone | see 9,10-Anthracenedione | |
| Anthrone | see 9(10H)-Anthracenone | |
| Benz[e]acephenanthrylene | $C_{20}H_{12}$ | 205-99-2 |
| Benz[c]acridine | $C_{17}H_{11}$ | 225-51-4 |
| Benz[a]anthracene | $C_{18}H_{12}$ | 56-55-3 |
| 7H-Benz[de]anthracen-7-one | $C_{17}H_{10}O$ | 82-05-3 |
| Benzanthrone | see 7H-Benz[de]anthracen-7-one | |
| Benzo[b]chrysene | $C_{22}H_{14}$ | 214-17-5 |
| Benzo[c]chrysene | $C_{22}H_{14}$ | 194-69-4 |

TABLE 1-continued

Polyaromatic Hydrocarbons, Their Formulas and Their Chemical Abstracts Service (CAS) Numbers.

| Name | Molecular Formula | CAS No. |
|---|---|---|
| Benzo[g]chrysene | $C_{22}H_{14}$ | 196-78-1 |
| Benzo[c]cinnoline | $C_{12}H_8N_2$ | 230-17-1 |
| Benzo[a]dibenzothiopbene | see Benzo[b]naphtho[2,1-d]-thiophene | |
| Benzo[b]fluoranthene | see Benz[e]ace-phenanthrylene | |
| Benzo[ghi]fluoranthene | $C_{18}H_{10}$ | 203-12-3 |
| Benzo[j]fluoranthene | $C_{20}H_{12}$ | 205-82-3 |
| Benzo[k]fluoranthene | $C_{20}H_{12}$ | 207-08-9 |
| 11H-Benzo[a]fluorene | $C_{17}H_{12}$ | 238-84-6 |
| 11H-Benzo[b]fluorene | $C_{17}H_{12}$ | 243-17-4 |
| 7H-Benzo[c]fluorene | $C_{17}H_{12}$ | 205-12-9 |
| Benzo[h]naphtho [1,2-f]quinolene | $C_{21}H_{13}$ | 196-79-2 |
| Benzo[b]naphtho[2,1-d]thiophene | $C_{16}H_{10}$ | 239-35-0 |
| Benzo[rst]pentaphene | $C_{24}H_{14}$ | 189-55-9 |
| Benzo[ghi]perylene | $C_{22}H_{12}$ | 191-24-2 |
| Benzo[c]phenanthrene | $C_{18}H_{12}$ | 195-19-7 |
| Benzo[a]pyrene | $C_{20}H_{12}$ | 50-32-8 |
| Benzo[e]pyrene | $C_{20}H_{12}$ | 192-97-2 |
| Benzo[f]quinoline | $C_{13}H_9$ | 85-02-9 |
| Benzo[h]quinoline | $C_{13}H_9$ | 230-27-3 |
| Benzo[b]triphenylene | $C_{22}H_{14}$ | 215-58-7 |
| Biphenylene | $C_{12}H_8$ | 259-79-0 |
| 9H-Carbazole | $C_{12}H_9$ | 86-74-8 |
| Chrysene | $C_{18}H_{12}$ | 218-01-9 |
| Coronene | $C_{24}H_{12}$ | 191-07-1 |
| 4H-Cyclopenta[def]phenanthrene | $C_{15}H_{10}$ | 203-64-5 |
| Cyclopenta[cd]pyrene | $C_{18}H_{10}$ | 27208-37-3 |
| Dibenz[a,h]acridine | $C_{21}H_{13}$ | 226-36-8 |
| Dibenz[a,j]acridine | $C_{21}H_{13}$ | 224-42-0 |
| Dibenz[c,h]acridine | $C_{21}H_{13}$ | 224-53-3 |
| Dibenz[a,c]anthracene | see Benzo[b]triphenylene | |
| Dibenz[a,h]anthracene | $C_{22}H_{14}$ | 53-07-3 |
| Dibenz[a,j]anthracene | $C_{22}H_{14}$ | 224-41-9 |
| 7H-Dibenzo[a,g]carbazole | $C_{20}H_{13}$ | 207-84-1 |
| 13H-Dibenzo[a,i]carbazole | $C_{20}H_{13}$ | 239-64-5 |
| 7H-Dibenzo[c,g]carbazole | $C_{20}H_{13}$ | 194-59-2 |
| Dibenzo[b,def]chrysene | $C_{24}H_{14}$ | 189-64-0 |
| Dibenzo[def,mno]chrysene | $C_{22}H_{12}$ | 191-26-4 |
| Dibenzo[def,p]chrysene | $C_{24}H_{14}$ | 191-30-0 |
| Dibenzo[b,h]phenanthrene | see Pentaphene | |
| Dibenzo[a,e]pyrene | see Naphtho[1,2,3,4-def]chrysene | |
| Dibenzo[a,h]pyrene | see Dibenzo[b,def]chrysene | |
| Dibenzo[a,i]pyrene | see Benzo[rst]pentaphene | |
| Dibenzo[a,l]pyrene | see Dibenzo[def,p]chrysene | |
| Dibenzothiophene | $C_{12}H_8S$ | 132-65-0 |
| Fluoranthene | $C_{16}H_{10}$ | 206-44-0 |
| 9H-Fluorene | $C_{13}H_{10}$ | 86-73-7 |
| 9H-Fluoren-9-one | $C_{13}H_8O$ | 484-25-9 |
| Indeno[1,2,3-cd]pyrene | $C_{22}H_{12}$ | 193-39-5 |
| 1H-Indole | $C_8H_7N$ | 120-72-9 |
| Isoquinoline | $C_9H_7N$ | 119-65-3 |
| Naphthacene | $C_{18}H_{12}$ | 92-24-0 |
| Naphthalene | $C_{10}H_8$ | 91-20-3 |
| Naphtho[1,2,3,4-def] chrysene | $C_{24}H_{14}$ | 192-65-4 |
| Naphtho[2,3-f]quinoline | $C_{17}H_{11}$ | 224-98-6 |
| Pentaphene | $C_{22}H_{14}$ | 222-93-5 |
| Perylene | $C_{20}H_{12}$ | 198-55-0 |
| 1H-Phenalene | $C_{13}H_{10}$ | 203-80-5 |
| Phenanthraquinone | see 9,10-Phenanthrenedione | |
| Phenanthrene | $C_{14}H_{10}$ | 85-01-8 |
| 9,10-Phenanthrenedione | $C_{14}H_8O_2$ | 84-11-7 |
| Phenanthridine | $C_{13}H_9N$ | 229-87-8 |
| 1,10-Phenanthroline | $C_{12}H_8N_2$ | 66-71-7 |
| Phenanthro[4,5-bcd]thiophene | $C_{14}H_8S$ | 30796-92-0 |
| Phenazine | $C_{12}H_8N_2$ | 92-82-0 |
| Phenazone | see Benzo[c]cinnoline | |
| Picene | $C_{22}H_{14}$ | 213-46-7 |
| Pyrene | $C_{16}H_{10}$ | 129-00-0 |
| Quinoline | $C_9H_7N$ | 91-22-5 |

TABLE 1-continued

| Polyaromatic Hydrocarbons, Their Formulas and Their Chemical Abstracts Service (CAS) Numbers. | | |
|---|---|---|
| Name | Molecular Formula | CAS No. |
| Triphenylene | $C_{18}H_{12}$ | 217-59-4 |
| 9H-Xanthene | $C_{13}H_{10}O$ | 92-83-1 |

$R_1$ before fluorination according to aspects of the disclosure may be $CH_2OCH_2CH(OH)(CH_2)_oCH(OH)CH_2OCH_2$ where o is from 1 to about 100 or $—CH_2OCH_2CHOHCH_2OH$. $R_1$ after fluorination may be selected from $—CF_2OCF_2CH(OH)(CF_2)_oCH(OH)CF_2OCF_2—$ where o is from 1 to about 100 or $—CF_2OCF_2CH(OH)CH_2OH$. The terminal —OH group may also be substituted with alternative —OH containing moieties, including:

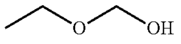
or
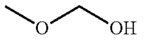
or
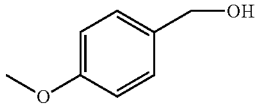

In aspects of the disclosure the functional group can also have the formula:

$$—(CH_2)_a—COOH$$

where a is from 1 to 20.

In an aspect of the disclosure, a lubricant having a reduced hydrocarbon fraction may include multiple segments each linked together by ether linkage according to a general formula:

$$Re^1—Rb^1-Ri—Rc—Ri—Rb^2-Re^2;$$

where Rc is a non-polar divalent center segment optionally including a perfluoroalkyl ether moiety;

where each of $Rb^1$ and $Rb^2$ is, independently, a sidechain segment including a perfluoroalkyl ether moiety having a reduced hydrocarbon fraction, where each Ri is optional, and independently may be a divalent linking segment including a functional group including elements from Group 13-17 of the periodic table of the elements, and where each of $Re^1$ and $Re^2$ is a functional group terminating in an —OH moiety.

In various aspects, the lubricant layer can be formed on the magnetic recording medium, specifically on the protective overcoat, via a dip coating method. For instance, in one aspect the magnetic recording medium may be dipped into a lubricant bath including the perfluorinated polyether (PFPE) boundary lubricant according to one or more aspects of the disclosure and a fluorocarbon solvent such as VERTREL-XF (1,1,1,2,3,4,4,5,5,5-decafluoropentane). After a predetermined amount of time, the magnetic recording medium may be removed from the lubricant bath at a controlled rate. The solvent may then evaporate, leaving behind a lubricant layer comprising the boundary lubricant according to one aspect of the disclosure. The percentage of the lubricant remaining on the surface of the magnetic recording medium after disposition of the lubricant may be referred to as the bonded percentage or the bonding percentage. The bonding percentage may be quantified for various time periods by exposing the lubricated magnetic recording medium with the solvent used in the lubricant bath.

In one aspect, the thickness of the lubricant layer may be tuned by controlling the submergence duration of the magnetic recording medium in the lubricant bath, the rate at which the magnetic recording medium is removed from the coating solution, and/or the concentration of the boundary lubricant in the lubricant bath.

In one or more aspects, the concentration of lubricant in the lubricant bath may be in a range from about 0.00001 g/L to about 100 g/L. In yet other aspects, the concentration of the lubricant in the lubricant bath may be selected so as to achieve a resulting lubricant layer with a thickness down to the Angstrom level.

One should note that formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure. In addition, the magnetic recording layer, the protective overcoat, and/or any of the other layers of the media (e.g., including each of the layers shown for media 200 in FIG. 2) may be formed using any of numerous deposition methods that are known in the art.

In the disclosure, the lubricant with a larger ratio of fluorocarbon to hydrocarbon has demonstrated an improved level of hydrocarbon contamination robustness, and the highly fluorinated lubricant has a thermogravimetric analysis curve in an oxidative atmosphere that approximates the thermogravimetric analysis curve in a non-oxidative atmosphere. The higher fluorocarbon content in the lubricant molecules yields a visible reduction in surface polarity of the lubricant thin film, a larger ratio of fluorocarbon to hydrocarbon in the lubricant layer make the polymer surface less active, leading to greater than 50% reductions of polar and dispersive surface energy of the lubricant monolayers, whereby an effective design thickness reduction is achievable for media lubricants used in I-DD products with the newly introduced molecular modification/architecture strategy.

Note that methodology presented herein for at least some of the various aspects may be implemented, in whole or in part, in computer hardware, by hand, using specialty equipment, and/or the like, and combinations thereof.

Moreover, any of the structures and/or steps may be implemented using known materials and/or techniques, as would become apparent to one skilled in the art upon reading the disclosure.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also include some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 20% of the reference value. For example, a thickness of about 10 nm refers to a thickness of 10 nm±2 nm, e.g., from 8 nm to 2 nm in this example. In another embodiment, the term "about" when combined with a value, may refer to plus and minus 10% of the reference value.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/or" refers to both the inclusive "and" case and the exclusive "or" case, and such term is used herein for brevity. For example, a composition formed from "A and/or B" may be A alone, B alone, or both A and B.

Various components described in this specification may be described as "including" and/or made of, and/or "having" certain materials, properties, or compositions of material(s). In one aspect, this can mean that the component has certain materials, properties, or compositions of materials. In another aspect, this can mean that the component has certain materials, properties, or compositions of material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other.

It is further noted that the term "over" and/or the term "on" as used in the disclosure in the context of one component located over another component, or in the context of one component located on another component, may be used to mean a component that is directly on a surface of another component e.g., disposed in physical contact with the surface of the other component, and/or in another component, e.g., directly embedded in a component. Thus, for example, a first component that is over or on the second component may mean that (1) the first component is located over or above the second component, but not directly touching the second component, (2) the first component is directly on (e.g., directly on a surface of) the second component, and/or (3) the first component is in (e.g., embedded in) the second component.

In the disclosure various ranges in values may be specified, described and/or claimed. It is noted that any time a range is specified, described and/or claimed in the specification and/or claim, it is meant to include the endpoints (at least in one aspect). In another aspect, the range may not include the endpoints of the range. In the disclosure various values (e.g., value X) may be specified, described and/or claimed. In one aspect, it should be understood that the value X may be exactly equal to X. In one aspect, it should be understood that the value X may be "about X," with the meaning noted above. Likewise, when a value is determined according to an equation, it is to be understood that in one aspect, the value is equal to the value calculated according to the equation and in another aspect, the value is about equal to the value calculated according to the equation according to the meaning noted above, or as is expressly provided for, e.g., plus or minus (±) a specific amount.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A highly fluorinated lubricant configured to be adsorbed by a magnetic recording medium, comprising:

$$R_1—R_f—R_1$$

where $R_f$ is $—CF_2O(CF_2CF_2O)_nCF_2—$ where n is from 1 to about 100, or $R_f$ is $—CF_2CF_2O(CF_2CF_2CF_2CF_2O)_s CF_2CF_2—$, $—CF_2CF_2O(CF_2CF_2CF_2O)_sCF_2CF_2—$, $—CF_2CF_2O[CF(CF_3)CF_2O]_sCF_2CF_2—$, $—CF_2O(CF_2CF_2O)$, $(CF_2O)_sCF_2—$, or $—CF_2O(CF_2CF_2O)_s CF_2—$, and r, s are independently from 1 to about 100 and $R_1$ is a fluorinated hydrocarbon having a functional group terminating in —OH.

2. The highly fluorinated lubricant of claim 1, wherein Ri before fluorination is selected from $—CH_2OCH_2CH(OH)(CH_2)_oCH(OH)CH_2OCH_2—$ where o is from 1 to 100 or $—CH_2OCH_2CH(OH)CH_2OH$, and after fluorination is selected from $—CF_2OCF_2CH(OH)(CF_2)_oCH(OH)CF_2OCF_2—$ where o is from 1 to about 100 or $—CF_2OCF_2CH(OH)CH_2OH$.

3. The highly fluorinated lubricant of claim 1, wherein the functional group terminates in a hydroxyl group, phosphonic acid group, a silanol group or a carboxylic acid group.

4. The highly fluorinated lubricant of claim 1, wherein the highly fluorinated lubricant has a first ratio of fluorocarbon to hydrocarbon and has a lower evaporation loss compared to a lubricant having a second ratio of fluorocarbon to hydrocarbon, the second ratio being less than the first ratio.

5. The highly fluorinated lubricant of claim 4, wherein a comparative ratio of the first ratio to the second ratio is about 1.1-10:1.

6. The highly fluorinated lubricant of claim 4, wherein a comparative ratio of the first ratio to the second ratio is about 1.5:1.

7. The highly fluorinated lubricant of claim 1, wherein the lubricant has a thermogravimetric analysis curve in an oxidative atmosphere that approximates a thermogravimetric analysis curve of the lubricant in a non-oxidative atmosphere such that a spread between respective curves in the non-oxidative atmosphere and the oxidative atmosphere is about 5° C. between peaks of derivative curves in the oxidative atmosphere and the non-oxidative atmosphere.

8. The highly fluorinated lubricant of claim 1, wherein the lubricant has a first ratio of fluorocarbon to hydrocarbon which yields a lower surface polarity than that of a lubricant with a second ratio of fluorocarbon the hydrocarbon, the second ratio being less than the first ratio.

9. The highly fluorinated lubricant of claim 8, wherein a comparative ratio of the first ratio to the second ratio is about 1.1-10:1.

10. The highly fluorinated lubricant of claim 8, wherein a comparative ratio of the first ratio to the second ratio is about 1.5:1.

11. The highly fluorinated lubricant of claim 1, wherein the lubricant has a first ratio of fluorocarbon to hydrocarbon which yields a lower polar surface energy and a decreased dispersive surface energy of the lubricant as compared to that of a lubricant with a second ratio of fluorocarbon to hydrocarbon, the second ratio being less than the first ratio, whereby lubricant thickness is reduced.

12. The highly fluorinated lubricant of claim 11, wherein a comparative ratio of the first ratio to the second ratio is about 1.1-10:1.

13. The highly fluorinated lubricant of claim 11, wherein a comparative ratio of the first ratio to the second ratio is about 1.5:1.

14. A magnetic recording medium, comprising:

a substrate;

a magnetic recording layer on the substrate;

an overcoat layer on the magnetic recording layer; and the lubricant of claim 1 adsorbed by the overcoat layer.

15. A data storage system, comprising;

at least one magnetic head;

a magnetic recording medium coated with a layer of the lubricant according claim 1;

a drive mechanism for positioning the at least one magnetic head over the magnetic recording medium; and a controller electrically coupled to the at least one magnetic head for controlling operation of the at least one magnetic head.

16. A data storage system, comprising:

a slider comprising at least one magnetic head and an air bearing surface, wherein a thin film of the lubricant according to claim 1 is disposed on the air bearing surface; and a magnetic recording medium including a magnetic recording layer; and wherein the slider is configured to write information to the magnetic recording layer using heat assisted magnetic recording, energy assisted magnetic recording, or microwave assisted magnetic recording.

* * * * *